March 9, 1926.  1,575,771
J. A. KING
THREE-WAY VALVE
Filed March 27, 1924   2 Sheets-Sheet 1

INVENTOR.
John A. King.
BY
ATTORNEYS

March 9, 1926.  1,575,771
J. A. KING
THREE-WAY VALVE
Filed March 27, 1924   2 Sheets-Sheet 2

INVENTOR.
John A. King.
BY
Emmi, Wheeler & Woolard
ATTORNEYS

Patented Mar. 9, 1926.

1,575,771

UNITED STATES PATENT OFFICE.

JOHN A. KING, OF MILWAUKEE, WISCONSIN, ASSIGNOR OF ONE-HALF TO WALTER H. RILEY, OF MILWAUKEE, WISCONSIN.

THREE-WAY VALVE.

Application filed March 27, 1924. Serial No. 702,305.

*To all whom it may concern:*

Be it known that I, JOHN A. KING, a citizen of the United States, and a resident of the city of Milwaukee, in the county of Milwaukee and State of Wisconsin, have invented certain new and useful Improvements in Three-Way Valves; and I do declare the following to be a clear, exact, and complete description thereof, such as will enable others skilled in the art to which the invention relates to make and use the same, reference being had to the accompanying drawings as illustrating some constructional forms in which the invention has been embodied.

The invention resides in a valve constituted as an elongated casing which is provided at its opposite ends with chambers which latter are separated by a constricted central portion of the casing, which portion is faced at its opposite ends so as to provide valve seats for the intermediate passage to which the said chambers are connected. From the said intermediate passage an opening through which the water may flow is provided.

A floating valve rod is arranged centrally with respect to the casing and is provided with spaced means or closures adapted to engage alternately the valve seats, so as to close the passage against the flow of water through the particular valve thus closed. The said valve rod is supported so as to float longitudinally by means of flexible diaphragms arranged at the outer ends of the casing and secured thereto.

The details of construction will now be described and the novel features of the invention will be pointed out in the claims.

Figure 1:
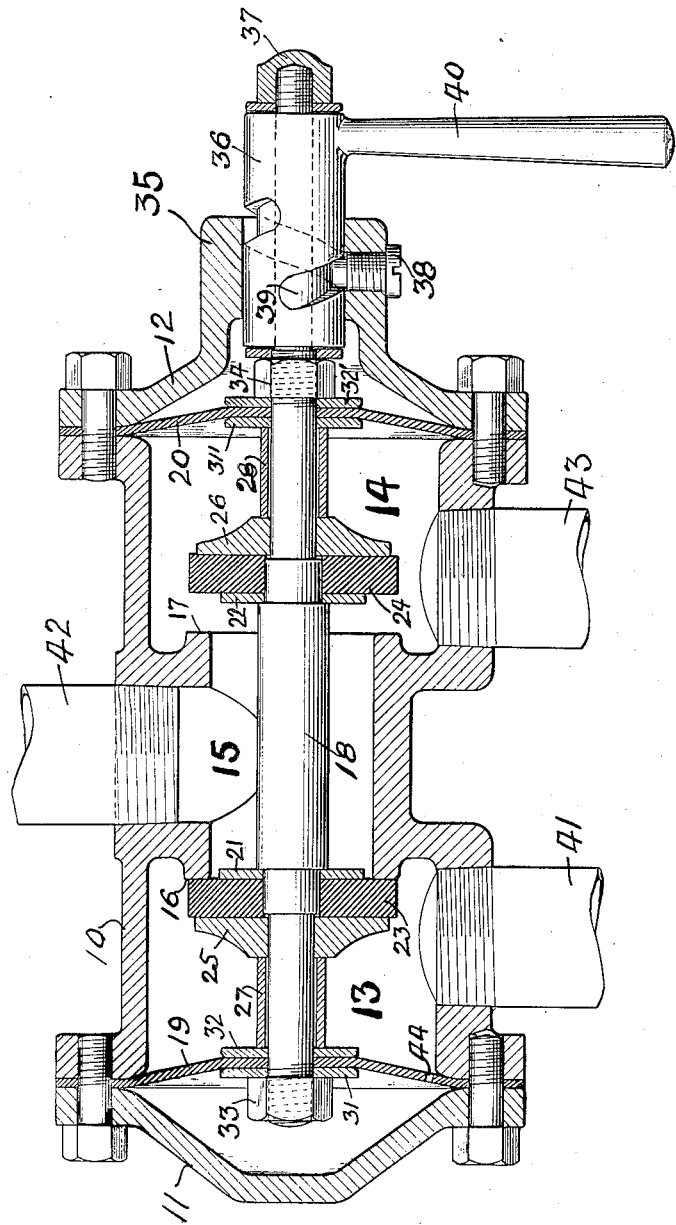
Figure 1 shows in longitudinal central section, with parts in elevation, a valve designed to be operated manually in supplying a tank with a measured quantity of water and for releasing such water for an outflow at the desired time.

The valve illustrated in Fig. 1 is designed primarilly for use in connection with concrete mixing machines, in which it is necessary that a predetermined volume of water be introduced into the batch at the desired time.

In the said Fig. 1 the numeral 10 indicates a tubular cylinder or casing provided at its opposite ends with caps 11 and 12, which latter complete the closure of chambers 13 and 14, respectively at the ends of the casing. Between the said chambers the interior of the casing is constricted so as to reduce the through opening and form a central passage 15, having at its ends valve seats 16 and 17.

A shaft 18 extends centrally through the casing, and is supported by diaphragms 19 and 20, the latter being secured to the ends of the casing by being clamped thereto by the caps 11 and 12, as will be clear from the illustration. Washers 21 and 22, surrounding the shaft and abutting circumferential shoulders thereon, support packing rings 23 and 24, which latter constitute the valve closures when engaged in alternation with the seats formed at the ends of the central intermediate passage 15. Discs 25 and 26 slipped over the reduced ends of the shaft 18, bear upon the packing rings, and distance pieces 27 and 28 sleeved in the same manner upon the shaft, bear against the said discs. The flexible diaphragms 19 and 20, having central perforations, are arranged between washers 31 and 32 and 31' and 32' and are secured in place by means of nuts 33 and 34, engaging threaded portions of the shaft 18, so that the packing rings are securely held upon the shaft in spaced relation, which exceeds somewhat the distance between the valve seats, so that the central passage may be closed at one side only at the same time, in the longitudinal reciprocating movement of the shaft 18. By means of this construction, the shaft is supported in the interior of the casing by the diaphragms so as to float longitudinally, and requires no other supporting bearings therein.

The cap 12 is formed with a central opening constituting a guide 35 in which may move with a spiral traverse, a sleeve 36, mounted loosely upon the extended end of the shaft 18, and is confined upon the shaft by a cap nut 37. A plug 38, secured radially in the guide 35, extends into a spiral cam groove 39, formed circumferentially about the sleeve 36, so that as the latter is rotated by the hand lever 40, longitudinal movement of the shaft 18 is effected, by reason of the confinement of the sleeve between the nuts 34 and 37.

An inlet pipe 41 leads to the chamber 13 of the casing, and a tank connection 42 leads from the passage 15. Rotation of the sleeve 36 from the position shown will close the valve at the right in Fig. 1, and open that at the left in the said figure. The tank will then be filled with the required quantity of water, due to the pressure in the main. At the desired moment, the sleeve will be reversely rotated so as to close the valve at the left in Fig. 1, and open that at the right, whereupon, the water in the tank will be discharged through the outlet pipe 43, leading from the chamber 14 of the casing. The diaphragm 19 is perforated as at 44, to permit the passage of the air which is trapped in applying the cap 11, and permit the movement of the shaft 18 without opposition.

Figure 2:
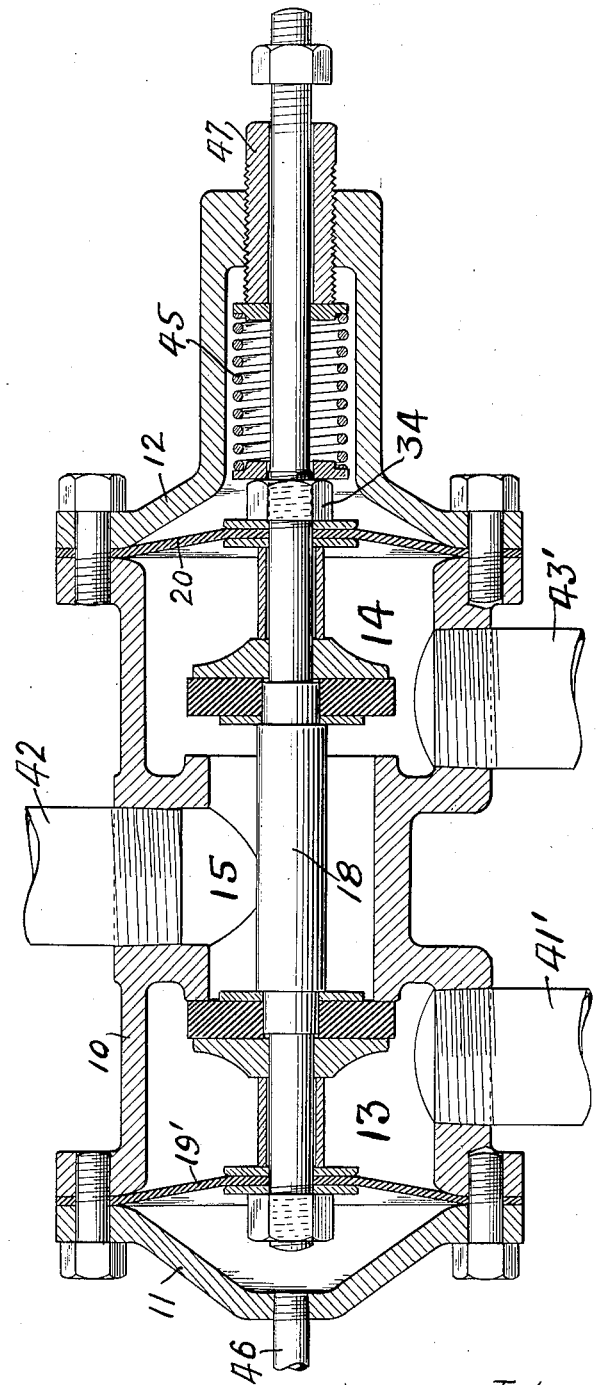
Fig. 2 is a like view of a valve designed for automatic operation.

In Fig. 2, I have illustrated the valve as adapted for automatic operation in connection with a domestic supply providing both hard and soft water. The construction generally is that as hereinbefore described, with slight modification of some of the features to enable the valve to perform its functions in this last connection. The valve construction is the same, and the plan of floating the valve shaft upon its supporting diaphragms is preserved.

The inlet pipe for the hard water is indicated 41′ and the inlet for the soft water 43′, the flow for both being through the central intermediate passage 15 and the pipe 42. In the position shown, the pump employed in connection with the soft water lift has filled the pipe 42 leads, and so by pressure holds the spring 45 under compression, opening the valve 14 at the right to maintain the valve open. This action is augmented by the pressure of the hard water upon the diaphragm 19′ at the left through the connection 46 with the hard water outlet. The said spring 45 is confined between the nut 34, threaded upon the shaft 18, and the nut 47 threaded in the cap, the said nut 47 being adjustable to vary the tension of the spring.

In drawing off the soft water through its outlet spigot leading from the pipe 42 the pump pressure is not relaxed, but is maintained as is also the hard water pressure against the diaphragm 19′.

In drawing off the hard water through its outlet spigot, leading from the pipe 42 the pressure against the diaphragm is immediately relaxed with the flow of the water, and the spring 45 exerts its stored energy to close the valve at the right and open that at the left, to permit the flow of the hard water under the main pressure so long as the outlet therefor is held open. The pressure of the hard water is the same as that of the soft water, and the pressure of both is slightly superior to that of the compressed spring 45.

A great advantage of the invention resides in its great durability, notwithstanding its very simple construction, and due to the latter, the accessibility of the enclosed parts. The flow of water under pressure serves to flush the valve and carry away impurities and deposits.

Having thus described my invention, what I claim and desire to secure by Letters Patent of the United States, is:—

1. In a three-way valve, a casing provided with a chamber at each end and an intermediate central passage connecting such chambers, caps upon the ends of the casing to complete the closure, diaphragms held upon the ends of the casing by the said caps, and a longitudinally movable shaft within the casing and supported at its ends in floating relation by the said diaphragms.

2. In a three-way valve, a casing provided with a chamber at each end and an intermediate central passage connecting such chambers, caps upon the ends of the casing to complete the closure, diaphragms held upon the ends of the casing by the said caps, a floating shaft supported by the said diaphragms and valve closures upon the shaft adapted to seat alternately upon the ends of the central passage.

3. In a three-way valve, a casing provided with a chamber at each end and a central passage connecting such chambers, the ends of the passage being formed as valve seats, caps attached to the ends of the casing to complete the closure, diaphragms held upon the ends of the casing by the said caps, and a longitudinally movable shaft within the casing and supported at its ends in floating relation thereto by the said diaphragms, and valves upon the said shaft adapted to engage alternately said valve seats.

4. In a three-way valve, a casing provided with a chamber at each end and a central passage connecting such chambers, the ends of the passage being formed as valve seats, caps attached to the ends of the casing to complete the closure, diaphragms held upon the ends of the casing by said caps, and a longitudinally movable shaft within the casing and supported at its ends in floating relation thereto by the said diaphragms, and means for moving the said shaft to cause the alternate engagement of the valves and their seats.

5. In a three-way valve, a casing provided with a chamber at each end and a central passage connecting said chambers, the ends of the passage being formed as valve seats, caps attached to the ends of the casing to complete the closure, diaphragms at the ends of the casing, a longitudinally movable shaft within the casing and supported at its ends in floating relation thereto by the said diaphragms, the casing being provided with an inlet to one of said chambers leading to the central passage and an outlet from the other of said chambers leading from the central passage, valves or closures upon the shaft, and means for moving the said shaft to open and close the valves in alternation.

6. In a three-way valve, a casing provided with a chamber at each end and a central passage connecting said chambers, caps and diaphragms closing the chambers at their outer ends, a longitudinally movable shaft arranged centrally of the casing and supported by the diaphragms, valves in the chambers carried by the shaft, and means for actuating the shaft to bring the valves alternately into closing relation with the central passage.

7. In a three-way valve, a casing provided at its opposite ends with enlarged chambers and reduced at its middle to provide a constricted passage connecting the said chambers, caps at the outer ends of the casing to complete the closure of the chambers, diaphragms fixed in the chambers and supporting a longitudinally movable shaft, valve closures on the said shaft, and means to move the shaft to engage the valve closures with the ends of the constricted passage in alternation to open and close the latter.

8. In a three-way valve, a casing provided with enlarged chambers at its opposite ends and with an intermediate passage connecting the said chambers, valve devices located in each of the chambers and operating in alternation to open and close the intermediate passage, a diaphragm confined in each of said chambers, a longitudinally movable shaft carrying the valve devices and supported by the said diaphragms, and means acting upon one end of the shaft to operate the valves in the manner set forth.

9. In a three-way valve, a casing having an intermediate passage provided with valve seats at its opposite ends, diaphragms supported in the casing at the ends of the passage, a shaft extending through the passage and supported for longitudinal movement by the diaphragms, means on the shaft for engaging the valve seats, and means for actuating the said shaft as set forth to open and close the valves in alternation.

10. In a three-way valve, a casing having chambers at its opposite ends and an intermediate passage connecting the same, one such chamber being provided with an inlet and the other with an outlet, the intermediate passage being provided with an opening for outflow from the said one such chamber and inflow to the said other chamber, a diaphragm arranged in the casing at each end and means for confining the same, a longitudinally movable shaft supported by the diaphragms and provided with means operating in the said chambers to close the ends of the intermediate passage in alternation, and means for so operating the said shaft.

11. In a three-way valve, a casing having chambers at its opposite ends and an intermediate passage connecting the said chambers, diaphragms arranged in the casing and supporting a longitudinally movable shaft, the latter being provided with means for closing the ends of the intermediate passage, and means for positively moving the shaft in both directions to alternately open and close the ends of said intermediate passage.

12. In a three-way valve, a casing having a chamber at each end with an intermediate passage connecting the said chambers, a diaphragm in each end chamber, and a shaft supported by the diaphragms for longitudinal movement in the chambers and passage, the said shaft carrying spaced means operating in alternation to open and close the ends of the intermediate passage in the movements of the shaft as set forth.

In testimony whereof, I have signed my name at Milwaukee, this 22d day of March, 1924.

J. A. KING.